June 27, 1933. S. G. STUCKEY 1,916,155
APPARATUS FOR GLASS FEEDING
Original Filed July 18, 1929 3 Sheets-Sheet 2
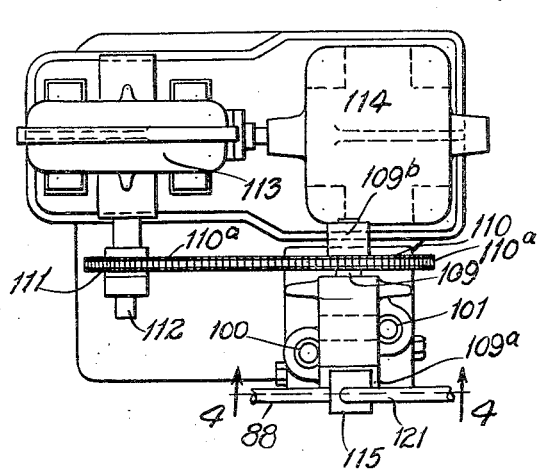
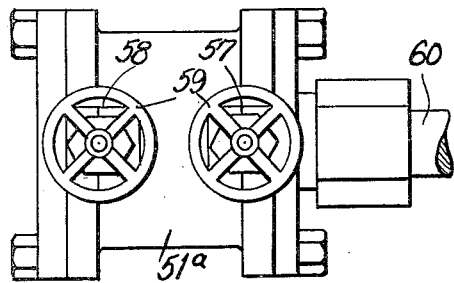
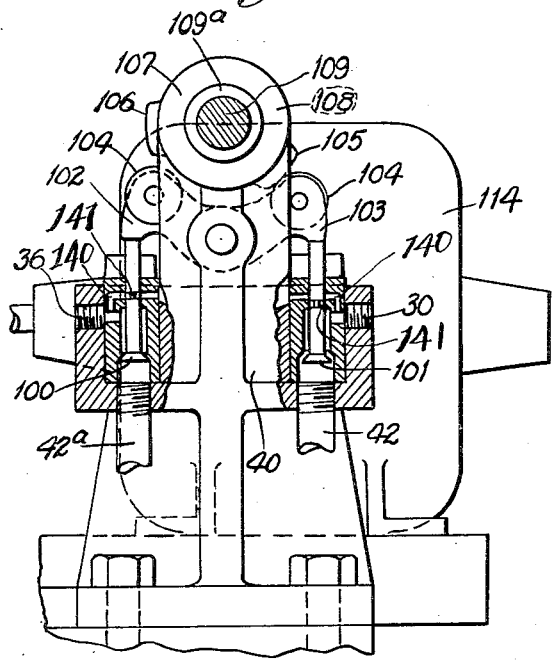
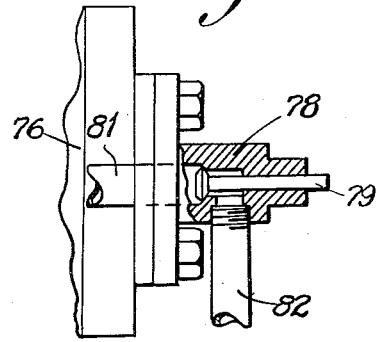
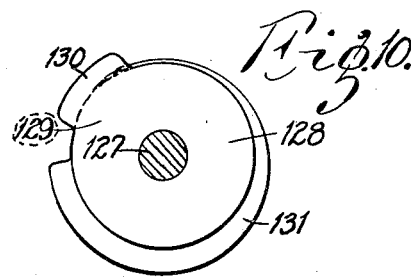
INVENTOR
SAMUEL G. STUCKEY
BY Edward E. Longan
ATTORNEY.

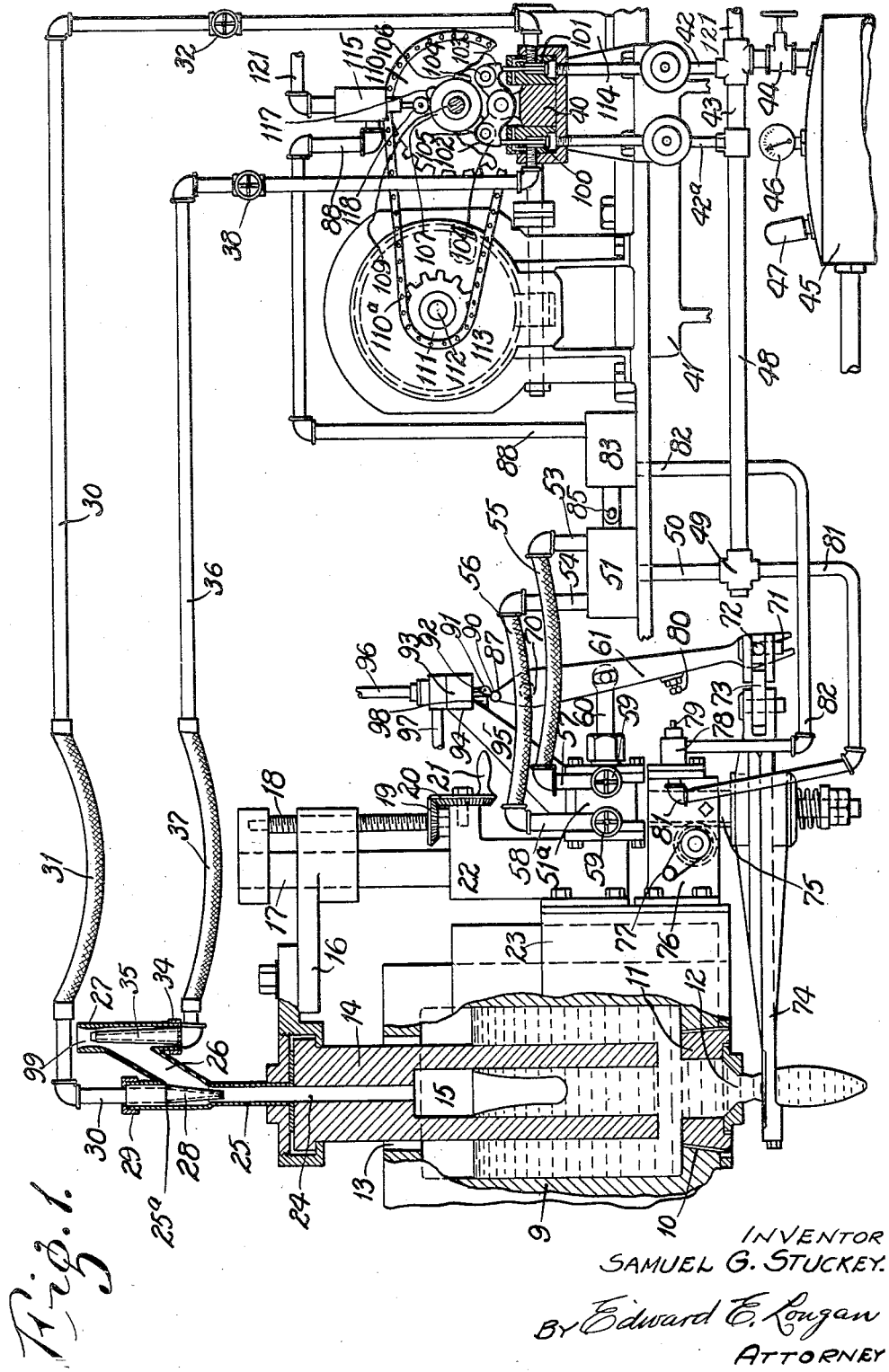

June 27, 1933.  S. G. STUCKEY  1,916,155
APPARATUS FOR GLASS FEEDING
Original Filed July 18, 1929   3 Sheets-Sheet 3
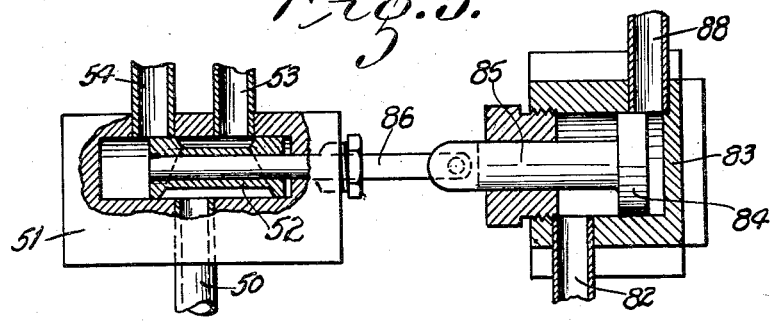
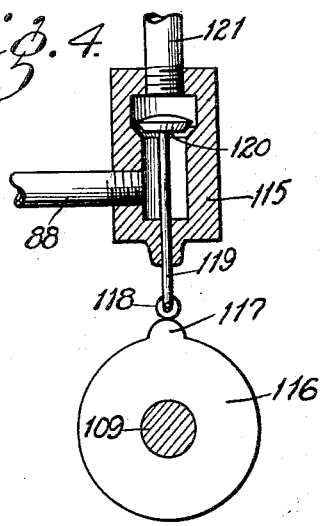
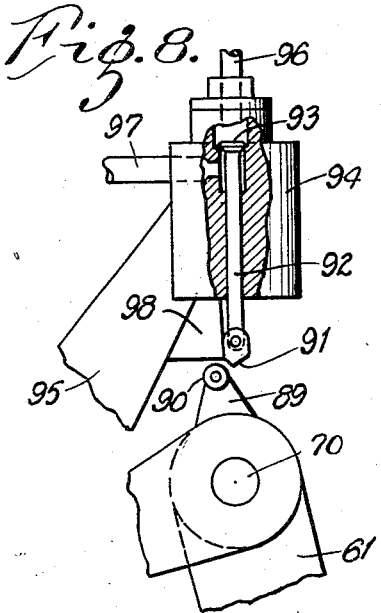
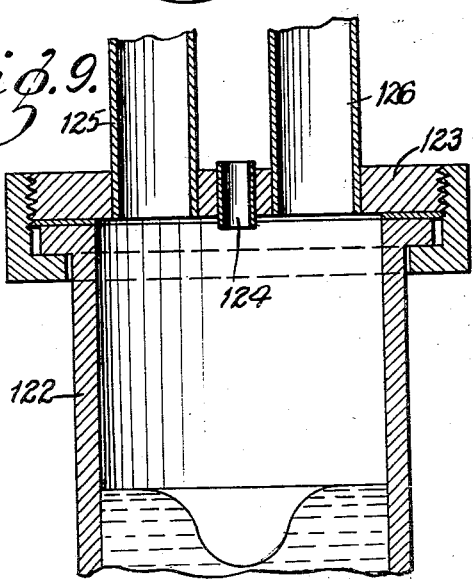
INVENTOR.
SAMUEL G. STUCKEY
BY Edward E. Longan
ATTORNEY

Patented June 27, 1933

1,916,155

UNITED STATES PATENT OFFICE

SAMUEL G. STUCKEY, OF ST. LOUIS, MISSOURI, ASSIGNOR TO OBEAR-NESTER GLASS COMPANY, OF ST. LOUIS, MISSOURI, A CORPORATION OF MISSOURI

APPARATUS FOR GLASS FEEDING

Application filed July 18, 1929, Serial No. 379,099. Renewed December 7, 1932.

My invention relates to improvements in apparatus for glass feeding, and has for its primary object an apparatus for feeding charges of molten glass into molds by the application of plus and minus pressures, these pressures being created alternately either by air or steam under pressure thereby eliminating the use of pumps for this purpose.

A further object is the method of feeding molten glass into molds by using a gaseous medium under pressure to create pressures above and below atmosphere on the surface of the confined body of glass so as to cause extrusive and intrusive movements of the glass through an outlet orifice.

A still further object is to construct an apparatus in which plus and minus pressures are created on the surface of the confined body of glass by means of a gaseous fluid under pressure only and using the same gaseous fluid to automatically operate a severing mechanism and to place the glass forming machine in operation.

A still further object is to construct an apparatus, as before mentioned, in which the various sequences of movements of the different parts are fixed relative to each other in such a manner that their cycles relative to each other cannot be changed.

In the drawings:

Fig. 1 is a side elevation of my device showing the same attached to the feed spout or forehearth of a glass furnace with portions of the device broken away and in section.

Fig. 2 is a top plan view of the timing device employed.

Fig. 3 is an enlarged side elevation of the same with parts broken away and in section.

Fig. 4 is an enlarged section of the timing device taken on the line 4—4 of Fig. 2.

Fig. 5 is an enlarged section of the valve and its operating mechanism which controls the operation of the shears or severing means.

Fig. 6 is an enlarged elevation of the air cylinder which operates the shears.

Fig. 7 is an enlarged view with parts in section of the valve used for reversing the action of the shears; and Fig. 8 is an enlarged fragmental view with parts in section of the valve employed for starting a glass forming machine on its cycle of operation.

Fig. 9 is a fragmental sectional view of the upper end of the tube showing the same arranged for remote control of the source of pressure and vacuum; and Fig. 10 is a side elevation of a modified form of cams employed for controlling the pressure and vacuum.

In the construction of my device I employ a glass furnace which is provided with the usual forehearth or feed spout 9. This feed spout is provided with an opening 10 in which is located a bushing 11, the bushing being provided with a bushing having an opening 12, which serves as an outlet orifice for the glass within the feed spout. This opening 12, it is to be understood, may be of various sizes according to the amount of glass and the diameter of the gob to be extruded.

The top of the feed spout is provided with an opening 13 through which extends a tube 14. This tube is preferably made of refractory material or such material as will not discolor the glass. The lower portion of the tube 14 is provided with an enlarged opening 15 in which glass is normally adapted to rise to the same level or height as in the feed spout. This tube, however, serves to confine the glass therein against lateral diffusion when pressure is applied thereto, and also serves to confine the air above the glass against lateral dissipation. The upper end of the tube is carried by a bracket 16. This bracket is slidably mounted on a rod or shaft 17 and is adjusted up and down by means of a screw 18, this screw being rotated by means of bevel gears 19 and 20, the gear 20 being provided with a handle 21 for rotating purposes. The shaft 17, the screw 18 and the gear 20 are carried by a bracket 22, which is bolted to a support 23. This support is carried by the glass furnace and also acts as a support for the feed spout 9.

Extending upwardly from the tubular member 14 and concentric with the opening 24 therein is a conduit or tubular member 25. This tubular member has attached thereto one leg 25a of a combined inspirator and aspirator which leg has an inclined extension or conduit 26 projecting therefrom, this extension is hollow or tubular and communicates with the interior of the member 25a, and carried by the inclined extension or conduit 26 is a leg or tubular extension 27.

Extending into the combined inspirator and aspirator 25a is a nozzle 28. This nozzle projects downwardly and terminates at a point slightly below the point of junction of the tubular extension 27 with the leg of the member 25a. The upper end of this leg is closed by means of a cap 29, which also tends to support the nozzle 28. Extending through the cap 29 and secured to the nozzle is a conduit 30. This conduit 30 has a portion 31 made flexible so that the tube 14 can be adjusted up and down.

The conduit 30 is provided with a throttle valve 32.

The lower end of the leg or tubular extension 27 is provided with a cap 34 which carries an upwardly extending nozzle 35. This nozzle terminates near the upper end of the leg or tubular member 27, which is open to the atmosphere. A conduit 36 is secured to the nozzle 35, this conduit having a flexible portion 37, which serves the same purpose as the flexible portion 31. The conduit 36 is provided with a throttle valve 38.

The conduits 30 and 36 enter a valve housing 40 which valve housing is mounted on a support 41. This support may be either a bracket carried by the glass furnace or it may be in form of a standard resting on the floor of the factory.

Entering the valve housing 40 are conduits 42 and 42a, which conduits are in turn attached to a conduit 43. The conduit 43 is provided with a valve 44 by means of which this conduit can be closed. The conduit 43 terminates in a container 45. This container may be either a reservoir for holding a gaseous medium, such as air under pressure, or it may be a steam boiler.

The conduits 42 and 42a are also provided with pressure regulating valves 33 and 39, respectively, by means of which the pressure of the gaseous medium delivered to the conduits 30 and 36 can be controlled.

The container 45 is provided with the usual pressure gauge 46 and a safety for blow-off valve 47.

The conduit 43 has an extension 48, which extension leads to a T 49. Extending from the T 49 is a pipe or conduit 50, which enters a valve housing 51 in which a spool valve 52 is located.

Attached to the valve housing 51 are conduits 53 and 54. These conduits carry flexible conduits 55 and 56 respectively. These conduits are in turn attached to conduits 57 and 58 respectively, which enter the air cylinder 51a. The air cylinder is adapted to have a piston therein for operating the shears.

The conduits 57 and 58 are provided with valves 59 by means of which the speed of reciprocation of the piston within the cylinder 51 is controlled. Projecting from the air cylinder 51a is a piston rod 60, which rod is pivotally attached to a rocker arm 61. The rocker arm 61 is pivoted at the point 70. The lower end of this arm is bifurcated as at 71 for the engagement with a pin 72.

The pin 72 is carried by links 73, which links in turn open and close the shears 74. The shears are supported on a stud 75, which is carried in a bracket 76. The stud is so arranged that it can be raised and lowered by means of a handle 77 thus permitting the shears to be adjusted to and from the outlet orifice.

Carried by the bracket 76 is a valve 78. This valve has projecting therefrom a valve stem 79, which is designed to be contacted with by the set screw 80 carried by a rocker arm 61.

Carried by the valve housing 78 is a pipe or conduit 81, which is connected to the pipe 48 by means of the T 49. A conduit 82 is also carried by the valve housing, which conduit terminates in the air cylinder 83. The air cylinder 83 has located therein a piston 84, which is provided with a piston rod 85. This piston rod is in turn connected to the valve stem 86 carried by the spool valve 52.

A conduit 88 is secured to the valve housing 115, which is mounted on the bearing 109a. This conduit is also attached to the air cylinder 83. The upper end of the rocker arm 61 is provided with a projection 89, which carries a roller 90. This roller is adapted to contact with a pivoted dog 91 carried by the valve stem 92. This valve has secured to its upper end a pocket valve 93, which valve is mounted in a valve housing 94, the valve housing being carried by the arm 95. Carried by the valve housing 94 is an air conduit 96 which receives air from a constant source of supply. A conduit 97 also extends from the valve housing 94, which conduit leads to the mechanism for placing a forming machine, not shown, in operation.

It will be noted that the pivotal dog 91 is free to swing in one direction so that the rocker arm can operate to close the shears without opening or raising the valve 93, but this dog is designed to contact with a boss 98 formed on the arm 95 to prevent its movement in the other direction so that as the rocker arm 61 swings into the position shown in Fig. 1, it will contact with the dog and open the valve 93 thus starting the forming machine on its cycle of operation.

I may, if desired, place a venturi 99 in the tubular extension 27 so as to increase the speed of the air through this extension and enhance vacuum created by the nozzle 35.

The valve housing 40 has valves 100 and 101, the stems of which are adapted to be contacted with by rocker arms 102 and 103. These rocker arms carry rollers 104, which are adapted to be contacted with by means or projections 105 and 106 carried by the cams 107 and 108. These cams are mounted on a shaft 109, which shaft is supported in suitable bearings 109a and 109b and which is provided with a sprocket wheel 110 over which a sprocket chain 110a passes. The sprocket chain also passes around a sprocket wheel 111, which is mounted on a shaft 112. This shaft is driven by means of worm gearing located in a housing 113. This worm gearing being of ordinary construction will not be described in detail. The worm gearing is preferably placed in operation by means of a variable speed electric motor 114, which is controlled by a rheostat (not shown). The sprocket wheels 110 and 111 may also be changed to provide speed changes, which cannot be obtained from the variable speed motor and rheostat.

The shaft 109 projects beyond the bearing 109a and has secured on its outer end a cam 116, which is provided with a cam lobe 117. The cam lobe is designed to contact with the roller 118 carried by the valve stem 119. This valve stem is in turn carried by the valve 120, which is located in the valve housing 115. The valve housing 115 also has secured thereto a pipe or conduit 121, the opposite end of which is connected to the container 45. If desired, a throttle valve may be introduced in this conduit so as to control the flow of air from the container 45 to the cylinder 83. In this way the operation of the shear or rather the gaseous medium used to operate the shear valve is received directly from the container. Therefore, when this valve is operated, it does not in any way use air from either of the valves 100 or 101.

The period of time in which the plus and minus pressures are exerted in the bell or tube 14 is regulated by the length of the lobes. This length being once determined, it remains the same for all sizes of ware because as the size of the ware decreases, it is necessary to speed up the machine as a whole. In other words, run the machine faster so that the length of time in which the cam lobes 105 and 106 are in contact with the rollers 104 will vary as the speed of the machine as a whole varies. This speed, of course, is controlled, as before stated, by the variable speed electric motor and rheostat. Therefore, it is unnecessary to make any change in the cam lobes for the various sizes of ware.

The cams also after being once set on the shaft 109 in predetermined angular relation to each other are fixed on the shaft and thereafter not adjusted, as I have found that angular adjustment of the cams during the operation of the machine is absolutely unnecessary and, in fact, detrimental since it not only changes the shape of the gob but, if the adjustment is too great, there is a possibility that the synchronism of the entire machine will be disturbed. Therefore, I have made no provision whatever for changing the angular position of the cams relative to each other in the shaft. It is essential, of course, in my device that the head of molten glass in the forehearth or well be maintained constant and that the molten glass in the tube or bell 14 always rises to the same level as the glass in the forehearth; in other words, the two are restored to equilibrium quickly.

I have also found it necessary to adjust the tube or bell to and from the outlet orifice according to the sized gob required and for preventing loss of pressure. This, of course, depends greatly upon the size of the outlet orifice in the bushing 11 so that the flow of glass from the forehearth beneath the lower end of the tube will always exceed the gravity flow through the orifice as otherwise it will be impossible to restore equilibrium.

In Fig. 9 I have disclosed a modified form of construction in which the bell or tube 122 has secured to its end a plate 123. This plate is provided with an opening 124 so that the interior of the bell will always communicate with the atmosphere.

Secured to the plate 123 are conduits 125 and 126. These conduits also communicate with the interior of the bell 122. The conduit 125 is designed to be attached to any suitable means for creating pressure, which may be either an injector or any other pressure creating means, and the conduit 126 connected to an injector or other vacuum producing means. By this construction the means for producing the pressure and vacuum may be located at a point remote from the tube or bell, the conduits 125 and 126 being flexible for at least a portion of their length similar to the conduits 30 and 36 so that the tube or bell 122 can be raised and lowered as required.

It will be noted that the diameters of the conduits 125 and 126 are in excess of the diameter of the opening 124. The purpose of this is that air or other gaseous medium can be introduced and withdrawn from the bell faster than it can pass through the opening 124 in either direction. In other words the opening 124 is small enough that when the plus pressure passes through the conduit 125 it will enter therein in greater volume than can escape through the opening 124. Consequently plus pressure will be created in the bell. When the vacuum is applied, the vacuum is created faster than atmospheric air can enter the opening 124 thereby creating minus pressure conditions within the bell.

From this construction it will be seen that my bell is open to atmosphere at all times but by means of introducing air or gaseous medium into the bell faster than it can escape and create a vacuum in the bell faster than it can enter the opening 124, I am enabled to create plus and minus pressure conditions within the bell, but as soon as these pressures cease, atmospheric conditions within the bell will be restored.

In Fig. 10 I have shown a modified form of cams to be used for introducing plus and minus pressures into the bell. In this figure the shaft 127 is driven in the same manner as the shaft 109. On the shaft are mounted cams 128 and 129. The cam 128 is provided with a cam lobe 130, which is designed to operate a rocker arm which controls a valve for operating an ejector so as to creat vacuum conditions within the bell.

The cam 129 is provided with a cam lobe 131 which operates a valve to place an injector in operation. It will be noted from Fig. 10 that the cam lobe 131 gradually increases in height and its starting point overlaps to some extent the cam lobe 130 so that at one time during the rotation of these cams both plus and minus pressures are exerted simultaneously within the bell. By thus constructing the cams I am enabled to introduce plus pressure while the vacuum is still on thereby restoring or reducing the vacuum to its zero point very quickly, and instantly after the zero point has been reached commence to exert plus pressure within the bell. It will, therefore, be seen that by this construction there is no appreciable period of normal or atmospheric pressure within the bell but the pressure goes almost instantly from vacuum to a gradually increasing plus pressure.

My purpose of introducing a gradually increasing plus pressure is that as more glass is extruded it will have a tendency to descend by gravity faster, and if the plus pressure is not gradually increased to take care of the increased weight below the outlet orifice, there is danger of the charge of glass descending faster than it is fed, and consequently necking in.

It will be noted, however, from Fig. 10 that after the plus pressure has ceased there is a short interval of time before the vacuum pressure is exerted. This permits a preliminary necking in of the glass before the vacuum is applied but the period between the cessation of the plus pressure and the application of the minus pressure is extremely short.

I may also, if desired, equip each of the cams with a plurality of lobes so that I may get two or more plus and minus impulses on the glass within the bell during each revolution of the cam. Therefore I can extrude a number of mold charges during each revolution of the cam making it possible to run the cams slower. This makes my device especially useful in making marbles and similar articles. This quickness of operation is due to the fact that I use either separate injectors and ejectors or a combined injector and ejector for each feed spout and these ejectors can be operated much faster than is possible with any pump of the reciprocating type because the injectors and ejectors have no moving parts. Consequently the vacuum and plus pressures can be reversed very quickly and without imparting any jar whatsoever on the apparatus.

I may, if desired, arrange the cam lobe 131 so that the plus pressure commences to be introduced at the same instant that the minus pressure application ceases without departing from the spirit of my invention.

While I have described cams in Fig. 10 as causing atmospheric condition restored to the bell between the cessation of the plus pressure and application of the vacuum this is only momentarily so that there will be no possibility of tearing the extruded mass apart by too sudden reversal in pressures.

I may also, if desired, lengthen the cam lobe 130 so that it will overlap the rear end of the cam lobe 131. In this way I am enabled to introduce a minus pressure or vacuum before the plus pressure entirely ceases thereby hastening the restoration to normal pressure, this overlapping of the pressures from plus to minus being similar to and for the same purpose as the overlapping of the minus to plus pressures, namely that I am enabled by this construction to go almost instantly from a plus to minus pressure and from a minus to plus pressure without having any measurable time whatsoever between the cessation of these two pressures. In other words I do not have any period at all, by this last described construction, at which an intermediate pressure, such as atmosphere, is applied. This is occasioned by the overlapping of the application of the plus and minus pressures at their commencement and cessation.

The operation of my device is as follows: The first step is to supply the container 45 with a gaseous medium under a predetermined pressure, this pressure being controlled by means of the safety valve 47. It is to be understood, of course, that the furnace has been previously started so that a constant supply of molten glass is available. The valve 44 is then opened permitting air or gaseous medium to pass through the conduits 42 and 42a and past the pressure regulating valves 33 and 39. The motor 114 is then started, which sets the worm drive in operation and through the operation of the sprocket chain 110a, the shaft 109, together with the cams 107 and 108, is placed in operation. The tube 14 is then adjusted to the proper height so that glass will flow out through the outlet orifice 12 in the bushing 11. The glass will then commence to flow out by gravity but during the rotation of the cam 108, the cam lobe 105 carried thereby will contact with the roller 104 carried by the rocker arm 102. This depresses the valve stem 100 permitting gaseous medium to pass from the conduit 42, through the valve housing and into the conduit 30 from where it passes out through the nozzle 28, which nozzle, being directed downwards, causes this gaseous medium to enter the interior 15 of the tube 14 exerting pressure on the upper surface of the glass in the tube and forcing it downward and outward through the outlet orifice 12. This pressure, however, is so controlled by means of the regulating valve 33 and the throttle valve 32 that it does not at any time exceed the head pressure of the molten glass in the forehearth. In fact this head pressure should always be in excess of the pressure within the tube.

After this pressure has been maintained for a predetermined length of time, which is controlled by the length of the cam lobe 105, the rocker arm 102 is released permitting the valve 100 to seat closing off air pressure. As soon as this occurs, the cam lobe 106 carried by the cam 107 comes in contact with the roller 104 carried by the rocker arm 103. This depresses the valve stem 101 opening the valve carried thereby and permits gaseous medium under pressure to pass from the conduit 42a and enter the conduit 36. The air thus entering the conduit passes through the nozzle 35, which is directed upward and blows out through the open end of the extension 27. The speed at which the gaseous medium passes through the nozzle 35 creates a vacuum in the extension 27 and consequently a vacuum in the conduit 25, which vacuum is transferred to the interior 15 of the tube 14. This draws the molten glass back up into the tube.

During the formation of the charge of glass, the cam lobe 117 of the cam 116 contacts with the roller 118 carried by the valve stem 119 raising the valve 120. This permits air from the reservoir or container 45 to pass through the pipe or conduit 121, through the valve housing 115, and into the conduit 88. From there it enters the air cylinder 83 to the rear of the piston 84 driving it forward, the piston 84 moving forward through the valve stem 85 and stem 86 moves the valve 52 in the valve housing forward thus permitting air from the container 45 to enter the valve housing 51, pass through the conduits 53, 55 and 57, and into the shear cylinder 51a moving the piston therein so that the rocker arm 61 will move forward and have a tendency to close the shears.

By adjusting the valve 59 in the conduit 57, the speed of this motion can be so controlled that the shears will commence cutting at the moment the vacuum is applied or immediately after the vacuum is applied so that there will be no piling up of oncoming glass on top of the shears. In fact the action of the vacuum will be to raise the severed end of the stub of glass remaining after the shearing up from the shears.

When the shears are completely closed the projection 80 on the arm 61 contacts with the valve stem 79, which permits air or other gaseous medium, which has been supplied to the valve housing 78 by the conduit 81, to enter the cylinder 83, moving the piston therein in the opposite direction or rearwardly. This in turn moves the valve 52 in the valve housing in the opposite direction and permits air to pass through the conduits 54, 56 and 58 into the shear cylinder 51a reversing the movement of the piston therein and opening the shears. All of these movements, however, must occur within one revolution of the cam 116, which will also be within one complete revolution of the cams 107 and 108.

During the last portion of the movement of this rocker arm, the roller 90 carried by the projection 89 contacts with the dog 91 raising the valve stem 92 and opening the valve 93. This permits gaseous medium to pass from the conduit 96 into the conduit 97 and from there to the operating mechanism of a glass forming machine. It is to be understood, of course, that the conduit 96 is connected to a suitable source of pressure, either directly to the container 45 or any other source. In this way it will be seen that all of the operations follow in a fixed sequence, which sequence cannot be altered nor is it possible to advance or retard one portion of this operating mechanism relative to an adjacent portion without altering the speed of the machine as a whole.

It is my particular purpose in this device to eliminate as much as possible the use of extreme abnormal pressures because the purpose of the plus pressure as applied to this device by means of the nozzle 28 is to prevent the gob or mold charge from necking in or pulling to a thread while being extruded so as to prevent it from lapping or twisting around in the parison mold after being severed and create a defect in the finished article, and the purpose of minus pressure is primarily to add to the effect of the head pressure in restoring equilibrium of glass level between the levels in the bell and in the forehearth quicker than it would naturally occur. This restoration will also naturally tend to stop the flow of glass through the outlet orifice and, in addition to this, have a slight lifting effect on the stub of glass remaining after the severing takes place so that it will not rest on the shears and become chilled thereby or thrown out of line when the shears open.

An important feature of my present structure is that the interior of the bell or tube 14 is open to atmosphere at all times so that atmospheric conditions within the tube will prevail as soon as either of the valves, which admit the gaseous pressure medium to either of the nozzles 28 and 35, close. In other words, atmospheric conditions are restored automatically and without the use of any valves whatsoever. Therefore, there can be no regulation, other than that which is determined by the proportion of the opening surrounding the nozzles to that of the opening in the nozzle, of time for the restoration of the interior of the bell to normal or atmospheric pressures but this restoration will take place instantly after the cessation of flow of gaseous medium through either of the nozzles.

It will be further noted that with my device it is not necessary to have any specially driven pump or pumps for supplying or creating plus and minus pressures within the tube or bell 14 but that both of these pressures are created within the tube from a source of constant pressure above normal atmospheric pressure, the quickness at which these pressures are created being controlled by the pressure regulating valves 33 and 39 and the throttle valves 32 and 38.

Another point which I desire to stress is that there are no bleeder valves whatsoever in the lines. The necessity of such valves is obviated by reason of the fact that the interior of the bell is always open to atmosphere as before stated, and that should the plus pressure become too great at any time, it can readily back out through the extensions 26 and 27, while if the vacuum is formed more quickly than it can be taken care of, it will automatically be reduced through the tendency of the air to enter the interior of the bell through the extensions 26 and 27. It will, therefore, be noted that in addition to the pressure regulating valves and throttle valves, I have what may be termed a constantly open, automatically operating compensating or opening directly in the bell so that the building up of any false or excess pressures is impossible.

An extremely important feature of my invention is that both the plus and minus pressures within the bell are produced by jets of gaseous medium under plus pressure, these jets being directed in opposite directions thereby eliminating the necessity of expensive machinery and valve systems for producing plus and minus pressure conditions in a confined space on a body of molten glass. In fact the body of molten glass subjected to these pressures is confined against lateral diffusion as are also the plus and minus pressures.

It has been the practice in the art of feeding charges of molten glass into molds from a submerged orifice to force out a certain amount of glass through this orifice and after its issue to permit it to elongate while suspended from above and stretch to a predetermined length so that it would be decreased in diameter sufficiently to pass into the blank mold. In producing gathers of this type, it was necessary that the initial gob or charge when extruded, be of greater diameter than the opening in the blank mold so that it can stretch while suspended in order to allow a reduction in diameter and a desired shape to be reached.

I have, however, discovered that by exerting only a slight pressure on the glass as it is being extruded, that is applying a pressure to a confined portion of the glass so that the confined portion of glass will descend slightly quicker than by gravity, I am enabled to produce a mold charge of glass of the proper length without wasting time for stretching and consequently I am able to get the mold charges of glass into the molds sooner than is possible by the former method.

As will be noted especially from Fig. 3 the valve housings may be provided with by-passes 140 and the valve stems with reduced portions 141 so that when the valves are seated these by-passes and reduced portions will act as releases thereby permitting the valves to be used either for cylinder valves or to prevent any pressure remaining in the conduits to which these valves are attached.

Having fully described my invention, what I claim is:—

1. A glass feeding apparatus comprising a molten-glass containing forehearth having a submerged outlet, and a constantly open atmospheric opening above the level of the molten glass and communicating therewith; and means for intermittently alternately forcing a gaseous medium into and withdrawing the same through said opening to actuate the molten glass in opposite directions at said outlet, said means being in constant communication with the atmosphere.

2. An apparatus for feeding glass and comprising a forehearth adapted to contain molten glass and having an outlet; a tube extending into said forehearth below the level of the molten glass therein and above said outlet and constantly open to the atmosphere above said glass; and means for intermittently alternately forcing a gaseous medium into said glass through said tube and thence withdrawing the same therefrom to control the discharge of the glass through said outlet, said means comprising a pair of conduits one of which discharges into said tube and the other of which discharges into the atmosphere through said atmospheric opening, and means for forcing said gaseous medium alternately and periodically through said conduits.

3. A glass feeding apparatus comprising a forehearth adapted to contain molten glass and having a submerged outlet, shears below said outlet, a tube extending into said forehearth below the level of the molten glass therein and above said outlet, an inspirator communicating with said tube and including a conduit communicating with the tube and continuously open to atmosphere, and means for intermittently and in timed relation to the operation of the shears for actuating said inspirator.

4. A glass feeding apparatus comprising a forehearth adapted to contain molten glass and having a submerged outlet, shears below said outlet, a tube extending into said forehearth below the level of the molten glass therein and above said outlet, an aspirator communicating with said tube and including a conduit communicating with the tube and continuously open to atmosphere, and means for intermittently and in timed relation to the operation of the shears for actuating said aspirator.

5. A glass feeding apparatus comprising a forehearth adapted to contain molten glass and having an outlet, shears below said outlet, a tube extending into said forehearth below the level of molten glass therein and above said outlet, a combined inspirator and aspirator communicating with said tube and including a conduit communicating with the tube and continuously open to atmosphere, and means for alternately and in timed relation to the operation of the shears for actuating said inspirator and aspirator.

In testimony whereof I have affixed my signature.

SAMUEL G. STUCKEY.